United States Patent
Wang et al.

(10) Patent No.: US 11,292,480 B2
(45) Date of Patent: Apr. 5, 2022

(54) REMOTE SAFE DRIVING METHODS AND SYSTEMS

(71) Applicant: TuSimple, Inc., San Diego, CA (US)

(72) Inventors: Yi Wang, San Diego, CA (US); Lindong Sun, San Diego, CA (US); Liu Liu, San Diego, CA (US); Xiaoling Han, San Diego, CA (US); Ruiliang Zhang, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 192 days.

(21) Appl. No.: 16/569,640

(22) Filed: Sep. 12, 2019

(65) Prior Publication Data
US 2020/0086884 A1    Mar. 19, 2020

Related U.S. Application Data

(60) Provisional application No. 62/730,912, filed on Sep. 13, 2018.

(51) Int. Cl.
*B60W 50/02* (2012.01)
*B60W 30/08* (2012.01)
(Continued)

(52) U.S. Cl.
CPC ............ *B60W 50/02* (2013.01); *B60W 30/08* (2013.01); *B60W 30/181* (2013.01);
(Continued)

(58) Field of Classification Search
CPC .... B60W 30/181; B60W 50/02; B60W 30/08; G05D 1/0055; G05D 1/0088; G05D 2201/0213; G07C 5/0816
See application file for complete search history.

(56) References Cited

U.S. PATENT DOCUMENTS

| | | |
|---|---|---|
| 6,084,870 A | 7/2000 | Wooten et al. |
| 6,263,088 B1 | 7/2001 | Crabtree |
| | (Continued) | |

FOREIGN PATENT DOCUMENTS

| | | | |
|---|---|---|---|
| CN | 106340197 A | | 1/2017 |
| CN | 106354130 A | * | 1/2017 |
| | (Continued) | | |

OTHER PUBLICATIONS

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).
(Continued)

*Primary Examiner* — Peter D Nolan
*Assistant Examiner* — Kenneth M Dunne
(74) *Attorney, Agent, or Firm* — Paul Liu; Perkins Coie, LLP

(57) ABSTRACT

Disclosed are devices, systems and methods for remote safe driving. One exemplary method includes detecting an emergency situation, and in response to the detecting the emergency situation, switching operation of the vehicle to a low-power operation mode that comprises shutting down a subset of vehicular components, and periodically transmitting a location of the vehicle to a remote monitoring center. Another exemplary method includes selecting at least one of a set of vehicular driving actions, and transmitting, over a secure connection, the at least one of the set of vehicular driving actions to the vehicle, wherein the set of vehicular driving actions is generated based on a classification of driver behavior.

20 Claims, 7 Drawing Sheets

(51) Int. Cl.
  *B60W 30/18*    (2012.01)
  *G05D 1/00*    (2006.01)
  *G07C 5/08*    (2006.01)

(52) U.S. Cl.
  CPC ......... *G05D 1/0055* (2013.01); *G05D 1/0088* (2013.01); *G07C 5/0816* (2013.01); *G05D 2201/0213* (2013.01)

(56) References Cited

U.S. PATENT DOCUMENTS

| | | | |
|---|---|---|---|
| 6,594,821 B1 | 7/2003 | Banning et al. | |
| 6,777,904 B1 | 8/2004 | Degner | |
| 6,975,923 B2 | 12/2005 | Spriggs | |
| 7,103,460 B1 | 9/2006 | Breed | |
| 7,499,804 B2 * | 3/2009 | Svendsen | G05D 1/027 340/426.11 |
| 7,689,559 B2 | 3/2010 | Canright | |
| 7,742,841 B2 | 6/2010 | Sakai et al. | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,346,480 B2 | 1/2013 | Trepagnier et al. | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,706,394 B2 | 4/2014 | Trepagnier et al. | |
| 8,718,861 B1 | 5/2014 | Montemerlo et al. | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,983,708 B2 | 3/2015 | Choe et al. | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,081,385 B1 | 7/2015 | Ferguson et al. | |
| 9,088,744 B2 | 7/2015 | Grauer et al. | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,214,084 B2 | 12/2015 | Grauer et al. | |
| 9,219,873 B2 | 12/2015 | Grauer et al. | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,282,144 B2 | 3/2016 | Tebay et al. | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman et al. | |
| 9,317,776 B1 | 4/2016 | Honda | |
| 9,330,334 B2 | 5/2016 | Lin | |
| 9,342,074 B2 | 5/2016 | Dolgov | |
| 9,347,779 B1 | 5/2016 | Lynch | |
| 9,355,635 B2 | 5/2016 | Gao | |
| 9,365,214 B2 | 6/2016 | Ben Shalom | |
| 9,399,397 B2 | 7/2016 | Mizutani | |
| 9,418,549 B2 | 8/2016 | Kang et al. | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,483,839 B1 | 11/2016 | Kwon | |
| 9,490,064 B2 | 11/2016 | Hirosawa | |
| 9,494,935 B2 | 11/2016 | Okumura et al. | |
| 9,507,346 B1 | 11/2016 | Levinson et al. | |
| 9,513,634 B2 | 12/2016 | Pack et al. | |
| 9,531,966 B2 | 12/2016 | Stein | |
| 9,535,423 B1 | 1/2017 | Debreczeni | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,555,803 B2 | 1/2017 | Pawlicki | |
| 9,568,915 B1 | 2/2017 | Berntorp | |
| 9,587,952 B1 | 3/2017 | Slusar | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,612,123 B1 | 4/2017 | Levinson et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,652,860 B1 | 5/2017 | Maali | |
| 9,669,827 B1 | 6/2017 | Ferguson et al. | |
| 9,672,446 B1 | 6/2017 | Vallesi-Gonzalez | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,720,418 B2 | 8/2017 | Stenneth | |
| 9,723,097 B2 | 8/2017 | Harris | |
| 9,723,099 B2 | 8/2017 | Chen | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,738,280 B2 | 8/2017 | Rayes | |
| 9,739,609 B1 | 8/2017 | Lewis | |
| 9,746,550 B2 | 8/2017 | Nath | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 9,953,236 B1 | 4/2018 | Huang | |
| 10,147,193 B2 | 12/2018 | Huang | |
| 10,223,806 B1 | 3/2019 | Yi et al. | |
| 10,223,807 B1 | 3/2019 | Yi et al. | |
| 10,410,055 B2 | 9/2019 | Wang et al. | |
| 10,676,099 B2 * | 6/2020 | Muehlmann | G06F 11/1687 |
| 10,782,685 B1 * | 9/2020 | Sucan | B60W 50/0225 |
| 10,919,463 B1 * | 2/2021 | Brown | B60W 20/50 |
| 11,022,977 B2 * | 6/2021 | Ho | B60W 50/029 |
| 2003/0114980 A1 | 6/2003 | Klausner et al. | |
| 2003/0174773 A1 | 9/2003 | Comaniciu | |

(56) References Cited

U.S. PATENT DOCUMENTS

| | | |
|---|---|---|
| 2004/0264763 A1 | 12/2004 | Mas et al. |
| 2007/0183661 A1 | 8/2007 | El-Maleh |
| 2007/0183662 A1 | 8/2007 | Wang |
| 2007/0230792 A1 | 10/2007 | Shashua |
| 2007/0286526 A1 | 12/2007 | Abousleman |
| 2008/0249667 A1 | 10/2008 | Horvitz |
| 2009/0040054 A1 | 2/2009 | Wang |
| 2009/0087029 A1 | 4/2009 | Coleman |
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko |
| 2013/0182134 A1 | 7/2013 | Grundmann et al. |
| 2013/0204465 A1 | 8/2013 | Phillips et al. |
| 2013/0266187 A1 | 10/2013 | Bulan |
| 2013/0329052 A1 | 12/2013 | Chew |
| 2014/0072170 A1 | 3/2014 | Zhang |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0195214 A1 | 7/2014 | Kozloski et al. |
| 2014/0198184 A1 | 7/2014 | Stein |
| 2014/0321704 A1 | 10/2014 | Partis |
| 2014/0334668 A1 | 11/2014 | Saund |
| 2015/0062304 A1 | 3/2015 | Stein |
| 2015/0269438 A1 | 9/2015 | Samarsekera et al. |
| 2015/0310370 A1 | 10/2015 | Burry |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0090476 A1* | 3/2017 | Letwin .................. G05D 1/0077 |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0301104 A1 | 10/2017 | Qian |
| 2017/0305423 A1 | 10/2017 | Green |
| 2017/0318407 A1 | 11/2017 | Meister |
| 2017/0341575 A1* | 11/2017 | Hauler ................... B60Q 7/005 |
| 2018/0024552 A1* | 1/2018 | She ......................... B60L 15/20 701/23 |
| 2018/0050704 A1* | 2/2018 | Tascione ................ B60W 10/04 |
| 2018/0074490 A1* | 3/2018 | Park ...................... G05D 1/0016 |
| 2018/0088589 A1* | 3/2018 | Hasegawa ......... H04L 12/40026 |
| 2018/0151063 A1 | 5/2018 | Pun |
| 2018/0154906 A1* | 6/2018 | Dudar ................. B60R 21/0136 |
| 2018/0158197 A1 | 6/2018 | Dasgupta |
| 2018/0260956 A1 | 9/2018 | Huang |
| 2018/0283892 A1 | 10/2018 | Behrendt |
| 2018/0364705 A1* | 12/2018 | Yunoki ................. G05D 1/0088 |
| 2018/0373980 A1 | 12/2018 | Huval |
| 2019/0001989 A1* | 1/2019 | Schoenfeld ....... B60W 50/0205 |
| 2019/0025853 A1 | 1/2019 | Julian |
| 2019/0064801 A1* | 2/2019 | Frazzoli ............... G05D 1/0061 |
| 2019/0065863 A1 | 2/2019 | Luo et al. |
| 2019/0066329 A1 | 2/2019 | Yi et al. |
| 2019/0066330 A1 | 2/2019 | Yi et al. |
| 2019/0066344 A1 | 2/2019 | Yi et al. |
| 2019/0108384 A1 | 4/2019 | Wang et al. |
| 2019/0132391 A1 | 5/2019 | Thomas |
| 2019/0132392 A1 | 5/2019 | Liu |
| 2019/0171205 A1* | 6/2019 | Kudanowski ....... B60W 50/023 |
| 2019/0196514 A1* | 6/2019 | Kanehara ........... G06K 9/00791 |
| 2019/0210564 A1 | 7/2019 | Han |
| 2019/0210613 A1 | 7/2019 | Sun |
| 2019/0236950 A1 | 8/2019 | Li |
| 2019/0250620 A1* | 8/2019 | Huang ................. G05D 1/0214 |
| 2019/0266420 A1 | 8/2019 | Ge |
| 2019/0337526 A1* | 11/2019 | Rave ...................... G07C 5/008 |
| 2020/0031362 A1* | 1/2020 | Lee ................... B60W 60/0059 |
| 2020/0139990 A1* | 5/2020 | Hiruma .................... G08G 1/16 |
| 2020/0331484 A1* | 10/2020 | Rodriguez Bravo ........................ G06F 21/554 |
| 2021/0089018 A1* | 3/2021 | Nordbruch ............ B60W 30/00 |
| 2021/0116907 A1* | 4/2021 | Altman ............. B60W 60/0015 |
| 2021/0316742 A1* | 10/2021 | Hayes ................ G05B 19/0428 |
| 2021/0331686 A1* | 10/2021 | Beyers .................. B60W 30/06 |

FOREIGN PATENT DOCUMENTS

| | | | |
|---|---|---|---|
| CN | 106781591 A | 5/2017 | |
| CN | 108010360 A | 5/2018 | |
| DE | 2608513 A1 | 9/1977 | |
| EP | 890470 B1 | 1/1999 | |
| EP | 2448251 A2 | 5/2012 | |
| EP | 2463843 A2 | 6/2012 | |
| EP | 2993654 A1 | 3/2016 | |
| EP | 3081419 A1 | 10/2016 | |
| JP | 2006-293837 A | 10/2006 | |
| JP | 2015074322 | * 4/2015 | ............ B60W 50/02 |
| KR | 10-2002-0092593 A | 12/2002 | |
| KR | 100802511 A1 | 2/2008 | |
| WO | 1991009375 A1 | 6/1991 | |
| WO | 2005098739 A1 | 10/2005 | |
| WO | 2005098751 A1 | 10/2005 | |
| WO | 2005098782 A1 | 10/2005 | |
| WO | 2010109419 A | 9/2010 | |
| WO | 2013045612 A1 | 4/2013 | |
| WO | 2014111814 A2 | 7/2014 | |
| WO | 2014166245 A1 | 10/2014 | |
| WO | 2014201324 A1 | 12/2014 | |
| WO | 2015083009 A1 | 6/2015 | |
| WO | 2015103159 A1 | 7/2015 | |
| WO | 2015125022 A2 | 8/2015 | |
| WO | 2015186002 A2 | 12/2015 | |
| WO | 2016090282 A1 | 6/2016 | |
| WO | 2016135736 A2 | 9/2016 | |
| WO | 2017079349 A1 | 5/2017 | |
| WO | 2017079460 A2 | 5/2017 | |
| WO | 2017013875 A1 | 5/2018 | |
| WO | 2019040800 A1 | 2/2019 | |
| WO | 2019084491 A1 | 5/2019 | |
| WO | 2019084494 A1 | 5/2019 | |
| WO | 2019140277 A2 | 7/2019 | |
| WO | 2019168986 A1 | 9/2019 | |
| WO | WO 2020058375 A1 | * 3/2020 | ......... G01C 21/3407 |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690, pp. 1-6, Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

(56) References Cited

OTHER PUBLICATIONS

Engel, J. et la. "LSD-SLAM: Large Scare Direct Monocular SLAM," pp. 1-16, Munich.
Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence (vol. 22, Issue: 11, pp. 1-5, Nov. 2000).
Bar-Hillel, Aharon et al. "Recent progress in road and lane detection: a survey." Machine Vision and Applications 25 (2011), pp. 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
Hou, Xiaodi et al., "Saliency Detection: A Spectral Residual Approach", Computer Vision and Pattern Recognition, CVPR'07—IEEE Conference, pp. 1-8, 2007.
Hou, Xiaodi et al., "Image Signature: Highlighting Sparse Salient Regions", IEEE Transactions on Pattern Analysis and Machine Intelligence, vol. 34, No. 1, pp. 194-201, 2012.
Hou, Xiaodi et al., "Dynamic Visual Attention: Searching For Coding Length Increments", Advances in Neural Information Processing Systems, vol. 21, pp. 681-688, 2008.
Li, Yin et al., "The Secrets of Salient Object Segmentation", Proceedings of the IEEE Conference on Computer Vision and Pattern Recognition, pp. 280-287, 2014.
Zhou, Bolei et al., "A Phase Discrepancy Analysis of Object Motion", Asian Conference on Computer Vision, pp. 225-238 (pp. 1-14), Springer Berlin Heidelberg, 2010.
Hou, Xiaodi and Yuille, Alan and Koch, Christof, "Boundary Detection Benchmarking Beyond F-Measures", Computer Vision and Pattern Recognition, CVPR'13, vol. 2013, pp. 1-8, IEEE, 2013.
Hou, Xiaodi et al., "Color Conceptualization", Proceedings of the 15th ACM International Conference on Multimedia, pp. 265-268, ACM, 2007.
Hou, Xiaodi, et al., "Thumbnail Generation Based on Global Saliency", Advances in Cognitive Neurodynamics, ICCN 2007, pp. 999-1003, Springer Netherlands, 2008.
Hou, Xiaodi et al., "A Meta-Theory of Boundary Detection Benchmarks", arXiv preprint arXiv: 1302.5985, pp. 1-4, 2013.
Li, Yanghao et al., "Revisiting Batch Normalization for Practical Domain Adaptation", arXiv preprint arXiv: 1603.04779, pp. 1-12, 2016.
Hou, Xiaodi, et al., "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv: 1702.08502, pp. 1-10, 2017.
Li, Yanghao and Wang, Naiyan and Liu, Jiaying and Hou, Xiaodi, "Factorized Bilinear Models for Image Recognition", arXiv preprint arXiv: 1611.05709, pp. 1-9, 2016.
Hou, Xiaodi, "Computational Modeling and Psychophysics in Low and Mid-Level Vision", California Institute of Technology, pp. 1-125, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 (pp. 18), Article first published online: Oct. 7, 2010; Issue published: Oct. 1, 2010.
Barth, Matthew et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 1-11, date unknown.
Ramos, Sebastian, et al., "Detecting Unexpected Obstacles for Self-Driving Cars Fusing Deep Learning and Geometric Modeling", arXiv:1612.06573v1 [cs.CV] pp. 1-8, Dec. 20, 2016.
Schroff, Florian, Dmitry Kalenichenko, James Philbin, (Google), "FaceNet: A Unified Embedding for Face Recognition and Clustering", CVPR, pp. 1-10, 2015.
Dai, Jifeng, Kaiming He, Jian Sun, (Microsoft Research), "Instance-aware Semantic Segmentation via Multi-task Network Cascades", CVPR, pp. 1, 2016.
Huval, Brody et al., "An Empirical Evaluation of Deep Learning on Highway Driving", arXiv:1504.01716v3 [cs.RO] pp. 1-7, Apr. 17, 2015.
Li, Tian, "Proposal Free Instance Segmentation Based on Instance-aware Metric", Department of Computer Science, Cranberry-Lemon University, Pittsburgh, PA., pp. 1-2, date unknown.
Norouzi, Mohammad, et al., "Hamming Distance Metric Learning", Departments of Computer Science and Statistics, University of Toronto, pp. 1-9, date unknown.
Jain, Suyong Dutt, Grauman, Kristen, "Active Image Segmentation Propagation", In Proceedings of the IEEE Conference on Computer Vision and Pattern Recognition (CVPR), Las Vegas, pp. 1-10, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv:1703.04977v1 [cs.CV] pp. 1-11, Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 1-6, Jun. 21-24, 2010.
Welinder, Peter, et al., "The Multidimensional Wisdom of Crowds" http://www.vision.caltech.edu/visipedia/papers/WelinderEtaINIPS10.pdf, pp. 1-9, 2010.
Yu, Kai et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Richter, Stephan R. et al., "Playing for Data: Ground Truth from Computer Games", Intel Labs, European Conference on Computer Vision (ECCV), Amsterdam, the Netherlands, pp. 1-16, 2016.
Athanasiadis, Thanos, et al., "Semantic Image Segmentation and Object Labeling", IEEE Transactions on Circuits and Systems for Video Technology, vol. 17, No. 3, pp. 1-15, Mar. 2007.
Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, pp. 1-29, 2016.
Somani, Adhira et al., "DESPOT: Online POMDP Planning with Regularization", Department of Computer Science, National University of Singapore, pp. 1-9, date unknown.
Paszke, Adam et al., Enet: A deep neural network architecture for real-time semantic segmentation. CoRR, abs/1606.02147, pp. 1-10, 2016.
Szeliski, Richard, "Computer Vision: Algorithms and Applications" http://szeliski.org/Book/, pp. 1-2, 2010.
Ahn, Kyoungho, Hesham Rakha, "The Effects of Route Choice Decisions on Vehicle Energy Consumption and Emissions", Virginia Tech Transportation Institute, Blacksburg, VA 24061, pp. 1-34, date unknown.

(56) References Cited

OTHER PUBLICATIONS

Park, Tae Wook. International Application No. PCT/US2019/050908, International Search Report and Written Opinion dated Jan. 6, 2020 (pp. 1-14).
International Preliminary Report on Patentability dated Mar. 25, 2021 for International Patent Application No. PCT/US2019/050908 (10 pages).

* cited by examiner

REMOTE SAFE DRIVING METHODS AND SYSTEMS

CROSS-REFERENCE TO RELATED APPLICATION

This patent document claims priority to and benefits of U.S. Provisional Patent Application No. 62/730,912, entitled "REMOTE SAFE DRIVING METHODS AND SYSTEMS," and filed on Sep. 13, 2018. The entire contents of the aforementioned patent application are incorporated by reference as part of the disclosure of this patent document.

TECHNICAL FIELD

This document relates to remote vehicle monitoring and control.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services.

SUMMARY

Disclosed are devices, systems and methods for remote safe driving, which include self-checking systems, emergency handling systems, and remote control systems. In an example, this may be achieved by a remote monitor center controlling some part of the monitoring and emergency handling services on the vehicle, and providing commands to ensure the safety of the vehicle and its passengers in the case of an emergency.

In one aspect, the disclosed technology can be used to provide a method for remote safe driving of a vehicle. This method may be implemented at the vehicle. The method includes detecting an emergency situation, and in response to the detecting the emergency situation, switching operation of the vehicle to a low-power operation mode that comprises shutting down a subset of vehicular components, and periodically transmitting a location of the vehicle to a remote monitoring center.

In another aspect, the disclosed technology can be used to provide another method for remote safe driving of a vehicle. This method may be implemented at a remote data center that is in communication with the vehicle. The method includes selecting at least one of a set of vehicular driving actions, and transmitting, over a secure connection, the at least one of the set of vehicular driving actions to the vehicle, wherein the set of vehicular driving actions is generated based on a classification of a plurality of driver behavior.

In yet another example aspect, a computing apparatus that includes a processor for implementing one of the methods recited herein is disclosed.

In yet another example aspect, a computer program product comprising a computer-readable program medium having code stored thereon is disclosed. The code, when executed by a processor, causes the processor to implement a method as described.

The above and other aspects and features of the disclosed technology are described in greater detail in the drawings, the description and the claims.

DETAILED DESCRIPTION

Autonomous vehicles use a variety of techniques to detect their surroundings, such as radar, laser light, GPS, odometry and computer vision. Control systems may interpret sensory information to identify appropriate navigation paths, as well as planned and unplanned obstacles and relevant signage along the route. The remote driving of vehicles may further rely on monitoring and classification systems that are capable of analyzing sensory data to distinguish between a variety of factors, e.g. different weather conditions, different cars on the road, and different obstacles.

Another integral feature of autonomous driving should be the safety of the vehicle and its passengers, as well as the safety of neighboring people and property. Thus, autonomous vehicles should be equipped with emergency handling systems to ensure the safe driving of the vehicles, especially when performed remotely. The response to an emergency situation should be rapid and precise, since safety is paramount. One of the main goals to enable widespread use of autonomous vehicles is to achieve and exceed the reliability of human driving behavior, and remote safe driving is integral to this goal. The techniques described in the present document can be incorporated in embodiments of a fully-autonomous vehicle, a semi-autonomous vehicle and/or a control center that controls operation of the autonomous vehicle. In particular, using the disclosed techniques, upon detection of an abnormality, an autonomous vehicle may safely stop further driving and ask for assistance. Similarly, in some embodiments, when a control center becomes aware of an autonomous vehicle's distress condition, the control center may provide the vehicle with further instructions to safely cease driving and wait for further assistance. These, and other, features are further described herein.

Figure 1:
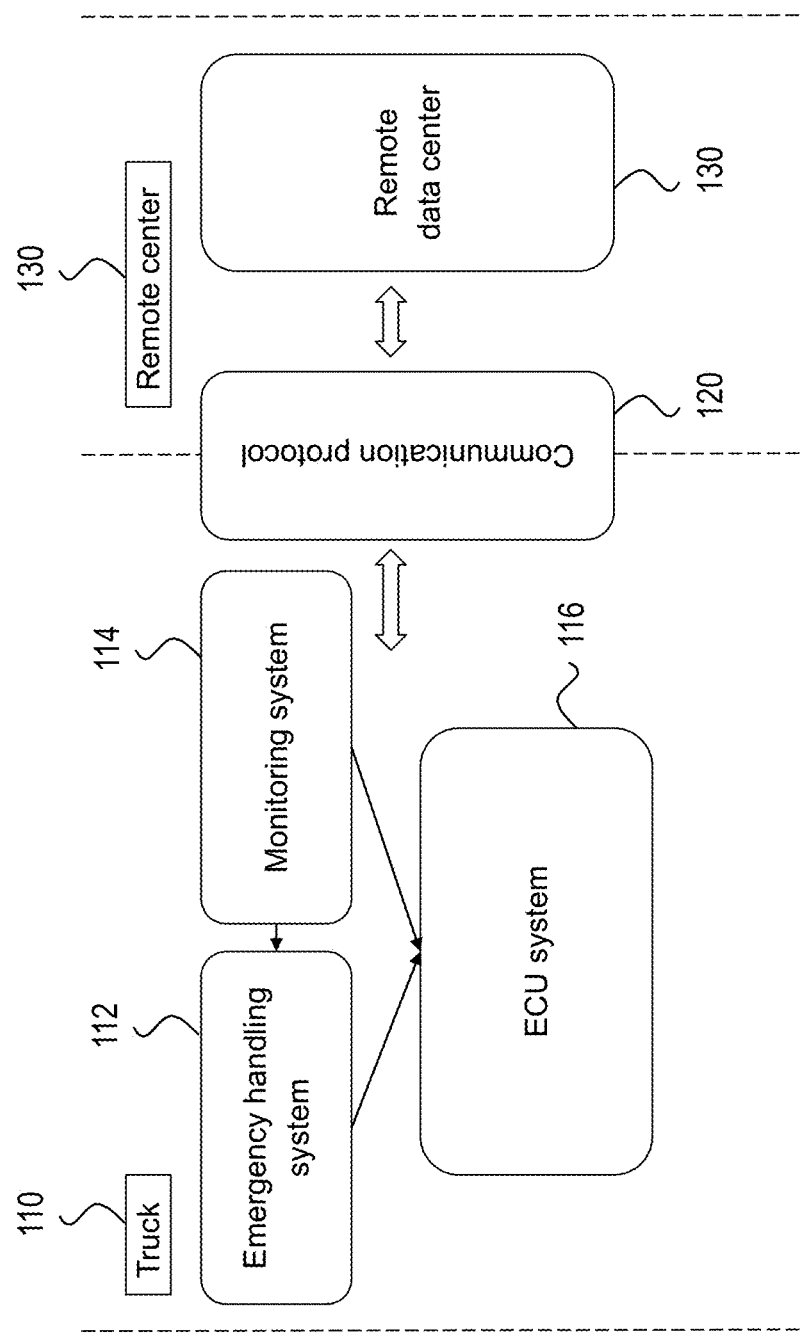
FIG. 1 shows a block diagram of an exemplary system for remote safe driving.

FIG. 1 shows a block diagram of an exemplary system for remote safe driving. As shown therein, the system for safe driving includes a truck 110 and a remote center (or remote data center, or remote monitor center) 130, which can communicate with each other through a communication protocol 120. In some embodiments, the truck 110 includes an emergency handling system 112, a monitoring system 114, and an electronic control unit (ECU) system 116.

In some embodiments, the emergency handling system defines several emergency status conditions, and corresponding autonomous vehicle actions for each status condition. For example, the emergency status conditions may include:

(a) a "truck/vehicle abnormal" status, which may include a CAN (Controller Area Network) bus response signal indicating any abnormality, (b) a "sensor abnormal" status, which may indicate that abnormalities with any of the sensors including the camera, radar, GPS, and inertial measurement unit (IMU) have been detected, e.g., a lack of a signal from one or more of these sensors, (c) an "ECU abnormal" status, which is a self-detection status check for the hardware components of the vehicle, (d) a "system abnormal" status, which may indicate a problem with the middleware, e.g., a middleware system deadlock that lasts for more than 3 seconds, (e) a "network abnormal" status, which may indicate a problem with the network, e.g., the network is disconnected, (f) a "car control fail" status, which indicates a failure in at least one self-detection test of the control module, e.g., no output or an abnormal output, (g) a "planning fail" status, which indicates a failure in at least one self-detection test of the planning module, e.g., no output or an abnormal output, (h) a "perception fail" status, which indicates a failure in at least one self-detection test of the perception module, e.g., no output or an abnormal output, and (i) a "localization fail" status, which indicates a failure in at least one self-detection test of the localization module, e.g., no output or an abnormal output.

In some embodiments, the vehicle may stop in an emergency lane when the "truck (or vehicle) abnormal" status indicator is detected, and may stop in the lane it is currently driving in when any of the other status indicator is detected.

In some embodiments, one or more of the enumerated emergency status conditions may be transmitted to the remote data center over a secure connection as soon as they are detected as part of an emergency signal. In other embodiments, the emergency status conditions may be transmitted as part of periodically transmitted monitoring signals. In yet other embodiments, a semi-persistent approach may be adopted, where periodic monitoring updates are transmitted from the vehicle to the remote data center, but an emergency signal transmission takes precedence and is transmitted as soon as it is generated.

In some embodiments, the remote data center may receive the necessary emergency signals from the vehicle over a dedicated and secure emergency channel. In one example, the status of the vehicle may be derived from the emergency signals received. In another example, the remote data center may receive the status of the vehicle from the vehicle itself, as part of the communication that contained the necessary emergency signals, or in a separate communication. In yet another example, the status condition (which may be a non-emergency or emergency status condition) may be accompanied by a corresponding report providing additional information related to that status condition.

In some embodiments, the emergency signals include a location and a vehicle status message. In an example, the location may be specified in absolute or relative coordinates. The vehicle status message may include a status indicator and specific information elements. In some embodiments, the status indicators may have levels or tiers, as shown in the example table below:

| Status | Data in report |
|---|---|
| OK | Basic vehicle (dynamic) information; e.g. location, fuel level, engine temperature, etc. |
| Warning | Warning messages and logs |
| Error | Error logs |
| Fatal | Sensor data that may identify the fatal condition |

In some embodiments, each of the enumerated status conditions may take on a value shown in the example table above, and may be transmitted to the remote data center, along with any corresponding information elements that may be required. In some embodiments, the operation of the vehicle, the generation of an emergency status, and the response required to resolve the emergency situation may be implemented as shown in the state diagram in FIG. 2.

Figure 2:
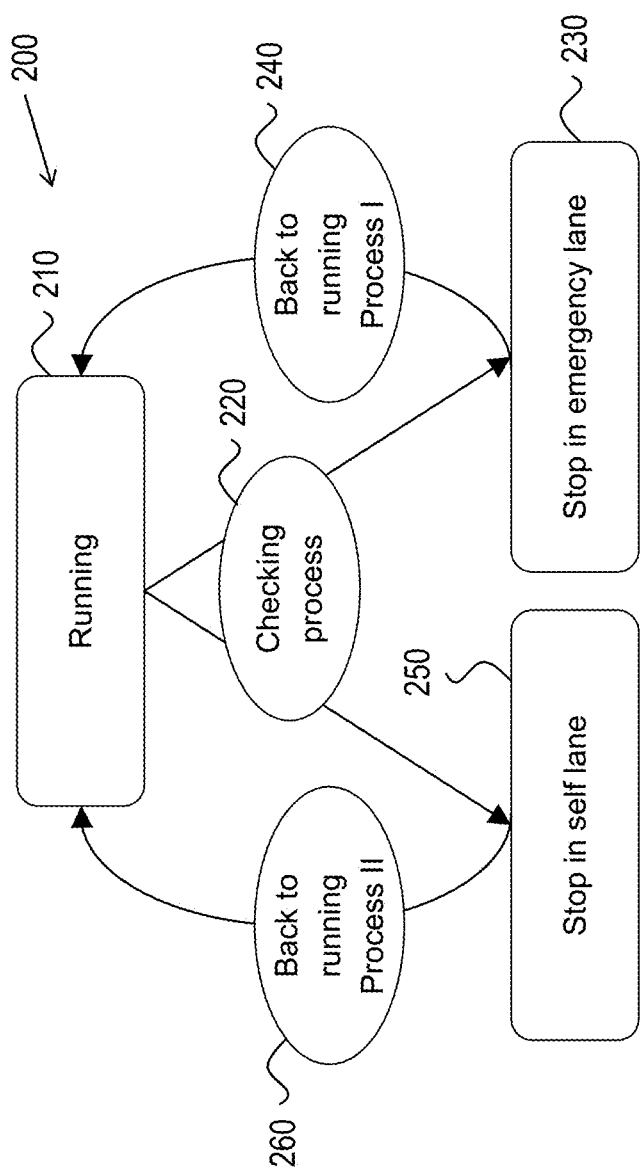
FIG. 2 shows an example state diagram implementing a procedure for remote safe driving.

FIG. 2 shows an example state diagram 200 implementing a procedure for remote safe driving. The state diagram 200 is typically, and ideally, operating in a "running" state 210, where the vehicle is operating as intended, with no failures in self-detection tests and no emergency status indications. In addition to operating in the "running" status, the vehicle may periodically (or semi-persistently, or aperiodically) perform the process 220. In an example, "checking process" includes running self-detection tests.

Upon detecting an emergency condition, the exemplary procedure for remote safe driving may implement one of at least two policy strategies. The first policy 230 dictates that the vehicle should search for the nearest emergency lane, and safely come to a stop in the emergency lane. The second policy 250 dictates that the vehicle stop in the lane it is currently operating in (referred to as the "self-lane"). For example, and under this policy, the vehicle may determine that an immediate stop may be required, and that the driving or emergency conditions may preclude taking the time to search for and move to an emergency lane.

When the vehicle has stopped in the emergency lane 230, the vehicle may take appropriate measures to address the emergency situation, and then restart from the emergency lane 240 (and referred to a Process I). Similarly, when the vehicle has stopped in the self-lane 250, it may restart from the self-lane 260 (referred to as Process II) after appropriate measures have been taken. Restarting operations from either the emergency lane or the self-lane returns the state of the vehicle to the "running" state 210, as shown in FIG. 2.

Figure 3:
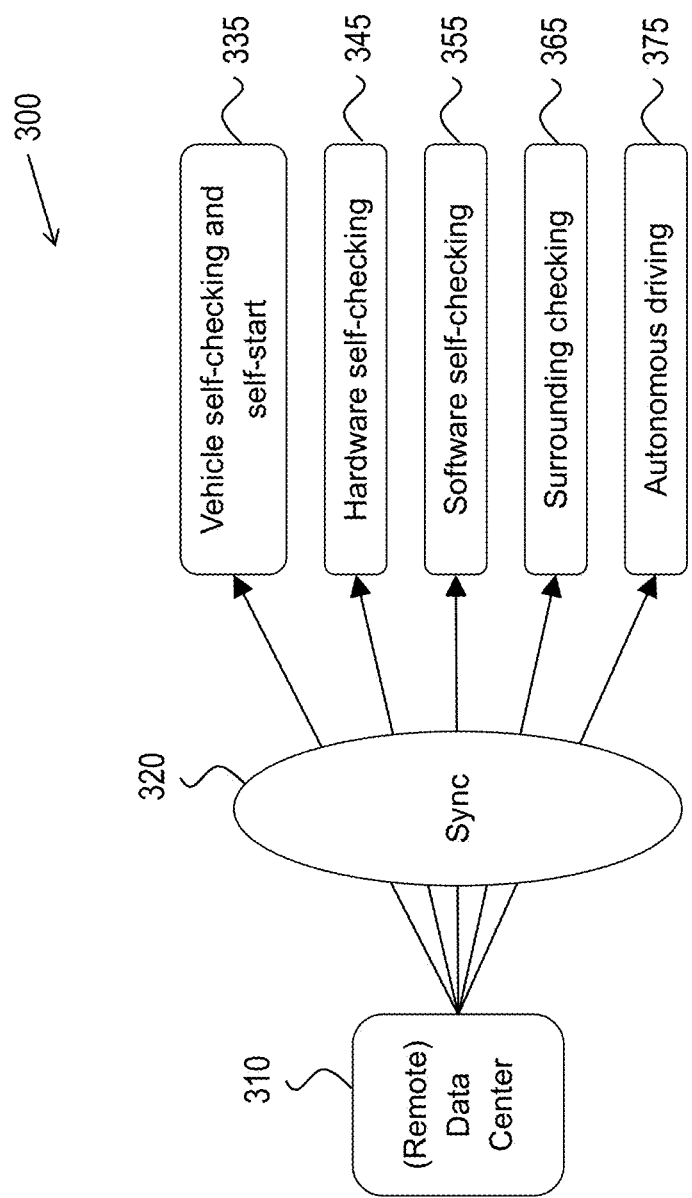
FIG. 3 shows an example state diagram implementing another procedure for remote safe driving.

FIG. 3 shows an example state diagram 300 implementing the "Process I" and "Process II" procedures (as discussed in the context of FIG. 2) for remote safe driving. As shown therein, the state diagram 300 includes remote data center (or simply, the "data center") 310 implementing a sync process 320 and a self-checking procedure for each subsystem in the vehicle to ensure that the vehicle may be may be restarted. For example, the sync process 320 ensures that the subsystem self-checks are implemented in a coordinated manner. In some embodiments, the vehicle self-checking and self-start process 335 includes running the self-check and reporting the results back to the data center, which remotely starts the vehicle.

In some embodiments, the hardware self-checking process 345 may include self-checking one or more of the ECU module (e.g., CPU, GPU, memory, mainboard), the sensor module (e.g., camera, radar, IMU, GPS sensor), and the power module (e.g., converter system), and reporting the results of each subsystem self-check to the data center 310.

In some embodiments, the software self-checking process 355 may include self-checking the Octopus platform, which is an open-source platform for graph-based program analysis. The software self-checking process may further include self-checking the algorithms modules (e.g., maps and localization, perception, control, motion planning).

In some embodiments, the surrounding checking process 365 may ensure other vehicles, objects and/or persons in the vicinity of the vehicle are accounted for prior to restarting.

In some embodiments, the autonomous driving process 375 includes bringing the vehicle into a semi- or fully-autonomous driving mode.

Figure 4:
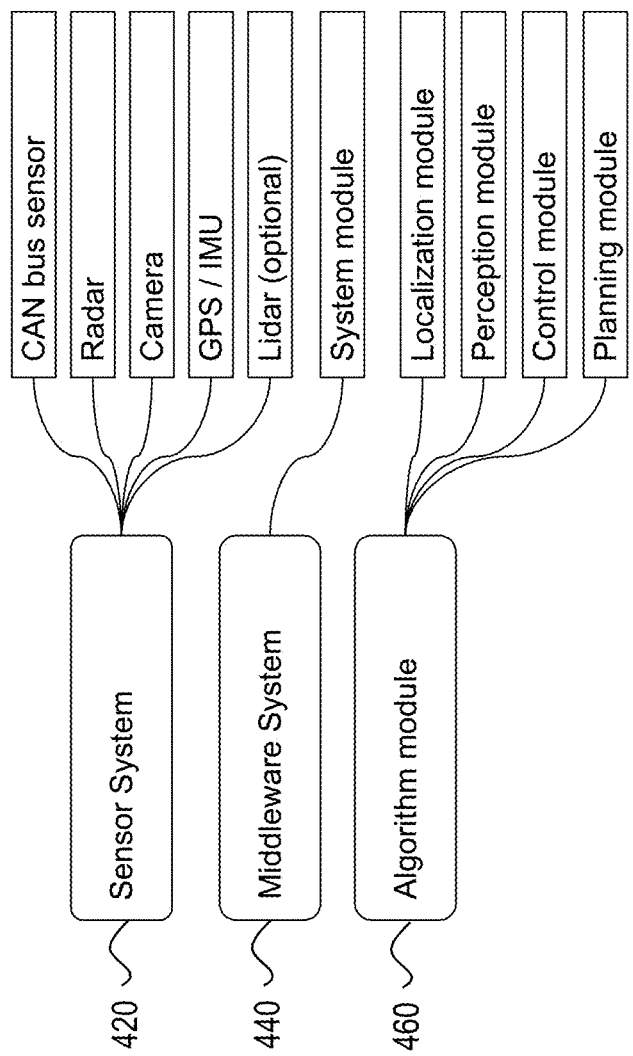
FIG. 4 shows a block diagram of example subcomponents of a vehicle that can support remote safe driving.

FIG. 4 shows a block diagram of example subcomponents of a vehicle that can support remote safe driving. In some embodiments, the vehicle may include a sensor system 420, a middleware system 440, and an algorithm module 460. In some embodiments, one or more of these subcomponents may be part of an ECU system (e.g. the ECU system 116 shown in FIG. 1). In other embodiments, the ECU system may control one or more of these systems and modules.

In an example, the sensor system 420 may include a CAN bus sensor, a camera, radar capabilities, a GPS unit and/or an IMU, and Lidar capabilities. In another example, the middleware system 440 may include the system module, and the algorithm module 460 may include a localization module, a perception module, a control module, and a planning module.

In some embodiments, a monitoring system (e.g. the monitoring system 114 shown in FIG. 1) may periodically (or continuously, or triggered aperiodically) monitor the status of each component of the sensor system 420, middleware system 440 and algorithm module 460. For example, the monitoring system receives a location message and a vehicle status message. In some embodiments, the location message may use GPS84 coordinates.

In some embodiments, the vehicle status message may be defined as including the following subfields, one or more of which may be transmitted at each time:

(1) vehicle running status as a 1-bit field with a "0" indicating that the vehicle is running and a "1" indicating that the vehicle has stopped;

(2) vehicle self-status using the standard or extended frame formats (as described in CAN 2.0 A and CAN 2.0 B);

(3) hardware status defined as:

| Field name | Length (bits) | Purpose |
| --- | --- | --- |
| Mainboard status | 6 | Indicates status of mainboard |
| CPU status | 6 | Indicates status of CPU |
| Memory status | 6 | Indicates status of memory |
| GPU status | 10 | Indicates status of GPU |
| Power status | 6 | Indicates status of power supply |

(4) system status defined as:

| Field name | Length (bits) | Purpose |
| --- | --- | --- |
| Middleware module status | 10 | Indicates status of middleware |
| Data status | 4 | Indicates status of data-based modules and data integrity |
| Algorithm module status | 20 | Indicates status of algorithm modules |

(5) algorithm status defined as:

| Field name | Length (bits) | Purpose |
| --- | --- | --- |
| Motion planning status | 8 | Indicates status of motion planning module |
| Control status | 8 | Indicates status of control module |
| Prediction status | 8 | Indicates status of prediction module |
| Localization/Pose status | 8 | Indicates status of localization and pose modules |

The message formats shown above are exemplary, and other formats with different lengths for the bitfields, as well as additional bitfields and status indicators, are envisioned as part of the disclosed technology.

Embodiments of the disclosed technology may be advantageously implemented in a modular fashion to support both fully-autonomous as well as semi-autonomous vehicles. For example, a semi-autonomous vehicle that is actively and safely being controlled by a driver may not need to implement autonomous driving (e.g., the autonomous driving process 375 in FIG. 3), self-checks for the control module (e.g. the control module that is part of the algorithm module 460 in FIG. 4), or use the control status bitfield as described above. The remote center may configure an implementation of the safe driving system described in this document to suit the needs of the driver and/or passengers of the fully- or semi-autonomous vehicle.

Figure 5:
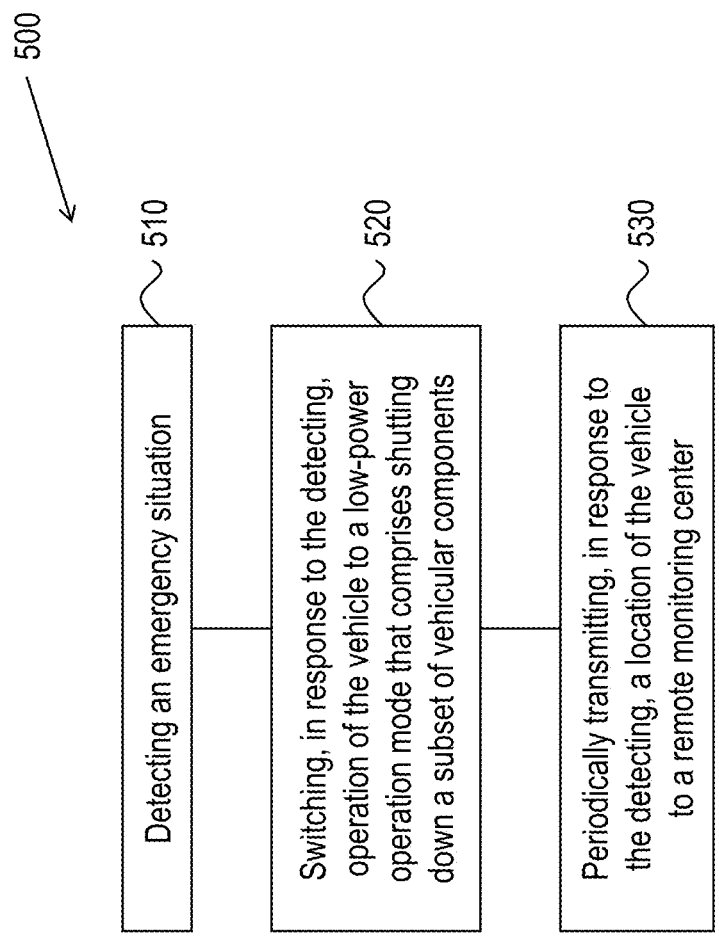
FIG. 5 shows a flowchart of an example method for remote safe driving.

FIG. 5 shows a flowchart of an example method 500, which may be implemented at the vehicle, for remote safe driving. The method 500 includes, at step 510, detecting an emergency situation. In some embodiments, the emergency situation may include an abnormal sensor operation, an abnormal electronic control unit (ECU) operation, an abnormal network operation, a communication failure, a failure of a planning module, a failure of a car control module, a failure of a localization module, or a failure of a perception module. In other embodiments, the emergency situation may include a failure or faulty operation of one or more of the subcomponents shown in the context of FIG. 4. In yet other embodiments, the emergency situation may be an event external to the vehicle (e.g. environmental or traffic-related).

The method includes, at step 520, switching, in response to the detecting, operation of the vehicle to a low-power operation mode that comprises shutting down a subset of vehicular components. In some embodiments, the subset of vehicular components include non-essential sensors and subsystems that are non-emergency subsystems. Since recovering from the emergency situation is integral to the safety of the vehicle and its passengers, and to people and property in the vicinity of the vehicle, subsystems that are not required to resolve the emergency situation are turned off in order to ensure enough power is available for critical subsystems. In an example, the non-emergency subsystems may include the vehicle entertainment subsystem, and map and navigation support for retail establishments and points of interest.

In some embodiments, subsystems may correspond to the sensor system, the middleware system and/or the algorithm module (as shown in FIG. 4). In other embodiments, a subsystem may correspond to the individual sensors (e.g. radar, camera, LiDAR, etc.) or the individual modules (e.g. localization module, perception module, etc.).

As discussed in the context of the state diagram shown in FIG. 2, a response to the emergency situation may include stopping the vehicle in either the self-lane or in an emergency lane. In some embodiments, and once the vehicle has been safely guided to a stop, another set of subcomponents that are critical to autonomous driving are shut down and restarted, and a status check is performed on at least one of the other set of components. This ensures that the vehicle is in a condition to either continue on its route or be diverted to a service station for further inspection. In other embodiments, if it is determined that further operation of the vehicle may not be safe, and other failsafe or precautionary procedures (e.g. calling for a tow truck) may be triggered, either by the emergency handling system or the remote data center.

In some embodiments, performing a status check an restarting (or starting) certain components may be based on the changing environment. For an example, if it starts to get dark while the vehicle remains on the side of the road, a status check may be performed on the hazard lights, which may then be turned on to ensure the visibility of the vehicle. For another example, if rush hour starts and parking restrictions are imposed in the right-most lane in which the vehicle is parked, a status check may be performed on the autonomous driving system (ADS), and the vehicle carefully driven to an alternate safe spot.

The method includes, at step 530, periodically transmitting, in response to the detecting, a location of the vehicle to a remote monitoring center. In some embodiments, as soon as any emergency status condition is detected, the vehicle may periodically transmit its GPS coordinates (or location relative to known mile markers, other landmarks, or Wi-Fi transmitters) to the remote data center. In an example, the period of the transmission of the vehicle location may be much shorter than a period typically used for transmitting monitoring status updates.

In some embodiments, cargo being hauled by the vehicle may be critically important to a customer and is deemed an essential component when an emergency is detected. For example, when the vehicle is transitioning to a low-power operating mode in which non-essential and non-emergency components are shut down, power may be routed to the cargo container to ensure that it is maintained at a predetermined thermal profile. The periodic transmission of the location of the vehicle will advantageously enable the remote center (e.g., 130 in FIG. 1) to determine how quickly the vehicle can return to operational status (e.g., by tracking a vehicle sent to assist the vehicle having the emergency), and it can explicitly ensure that the thermal profile of the cargo container is maintained per customer requests.

Figure 6:
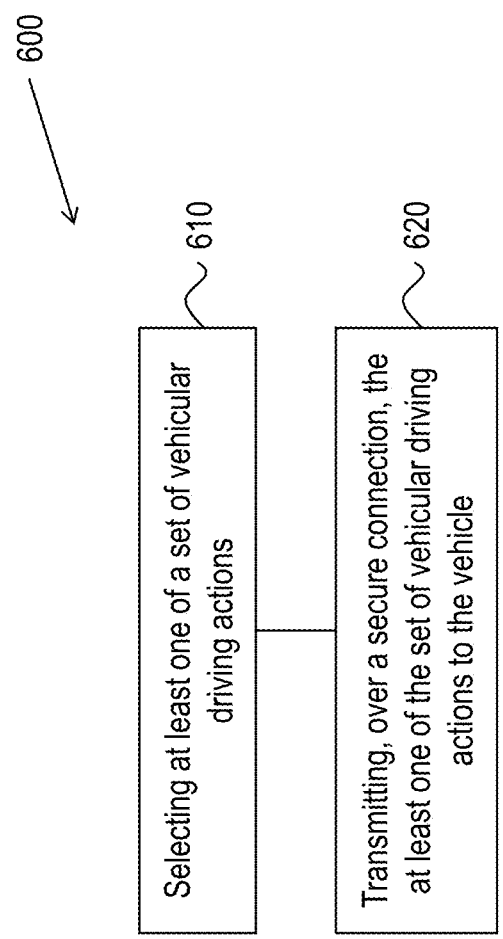
FIG. 6 shows a flowchart for another example method for remote safe driving.

FIG. 6 shows a flowchart for an example method 600, which may be implemented at a remote data center, for remote safe driving. The method 600 includes, at step 610, selecting at least one of a set of vehicular driving actions. In some embodiments, the vehicular driving actions may include parking the vehicle, moving from a predetermined origin to a predetermined destination, and moving to a refueling location. In some embodiments, the enumeration of the vehicular driving actions may be generated based on a classification of driver behavior.

For example, the classification may be a clustering algorithm that uses a data set of driver behavior, which may be used to train the algorithm to identify the aforementioned vehicular driving actions. The clustering algorithm may be a hierarchical clustering algorithm, a centroid-based clustering algorithm, a distribution-based clustering algorithm, or other such supervised learning algorithms.

The method 600 includes, at step 620, transmitting, over a secure connection, the at least one of the set of vehicular driving actions to the vehicle. In some embodiments, the secure connection may be the emergency channel (or link) exclusively that is reserved for emergency communications. In other embodiments, the secure connection may be an operational channel (or link) that is typically used for high-speed data communications.

In some embodiments, the operational link may be secured using an Internet layer cryptographic protocol, which enforces authenticity, integrity and secrecy. In an example, the operational link may use the Internet Protocol security (IPsec) protocol, pre-shared keys (PSK) or a public-key cryptosystem, e.g. RSA or Diffie-Hellman key exchange. The emergency channel may be secured using a low-latency Application layer cryptographic protocol, due to the imperative nature of emergency communications. In an example, the Secure Sockets Layer (SSL) protocol or the Transport Layer Security (TLS) protocol may be used for the emergency channel, which due to the time sensitive nature of the messages, does not require explicit client authentication after an initial authentication process.

Embodiments of the disclosed technology can be configured to implement solutions for remote safe driving as discussed in this document. These solutions include:

1. A method for remote safe driving of a vehicle, comprising: detecting an emergency situation; and in response to the detecting, switching operation of the vehicle to a low-power operation mode that comprises shutting down a subset of vehicular components; and periodically transmitting a location of the vehicle to a remote monitoring center.

2. The method of solution 1, wherein the emergency situation comprises an abnormal sensor operation, an abnormal electronic control unit (ECU) operation, an abnormal network operation, a communication failure, a failure of a planning module, a failure of a car control module, a failure of a localization module, or a failure of a perception module.

3. The method of solution 1 or 2, wherein the subset of vehicular components comprises non-essential sensors and non-emergency subsystems.

4. The method of any of solutions 1 to 3, further comprising: stopping the vehicle due to the emergency situation; shutting down and restarting another subset of vehicular components; and performing a status check on at least one of the another subset of vehicular components.

In some solutions, the other set of vehicular components that are restarted may be selected in response to changes in the external environment. For an example, if the vehicle has come to a stop and dusk is approaching, the hazard lights will be turned on to ensure the visibility of the vehicle by other vehicles.

5. The method of solution 4, wherein the vehicle stops in a lane in which the vehicle is operating.

6. The method of solution 4, wherein stopping the vehicle comprises: finding an emergency lane; and stopping the vehicle in the emergency lane.

7. The method of any of solutions 4 to 6, further comprising: selectively restarting the operation of the vehicle based on a result of the status check.

8. The method of any of solutions 1 to 7, wherein the location of the vehicle comprises at least one of Global Positioning System (GPS) coordinates, a location relative to mile markers, or a location relative to known Wi-Fi transmitters.

9. A method for remote safe driving of a vehicle, comprising: selecting at least one of a set of vehicular driving actions; and transmitting, over a secure communication channel, the at least one of the set of vehicular driving actions to the vehicle, wherein the set of vehicular driving actions is generated based on a classification of driver behavior.

10. The method of solution 9, wherein the set of vehicular driving actions comprises one or more of parking the vehicle, moving from a predetermined origin to a predetermined destination, and moving to a refueling location.

11. The method of solution 9 or 10, wherein the classification of the plurality of driver behavior is based on a clustering algorithm.

12. The method of any of solutions 9 to 11, wherein the secure communication channel is an operational channel that is secured using an Internet layer cryptographic protocol.

13. The method of any of solutions 9 to 11, wherein the secure communication channel is an emergency channel that is secured using a low-latency Application layer cryptographic protocol.

Figure 7:
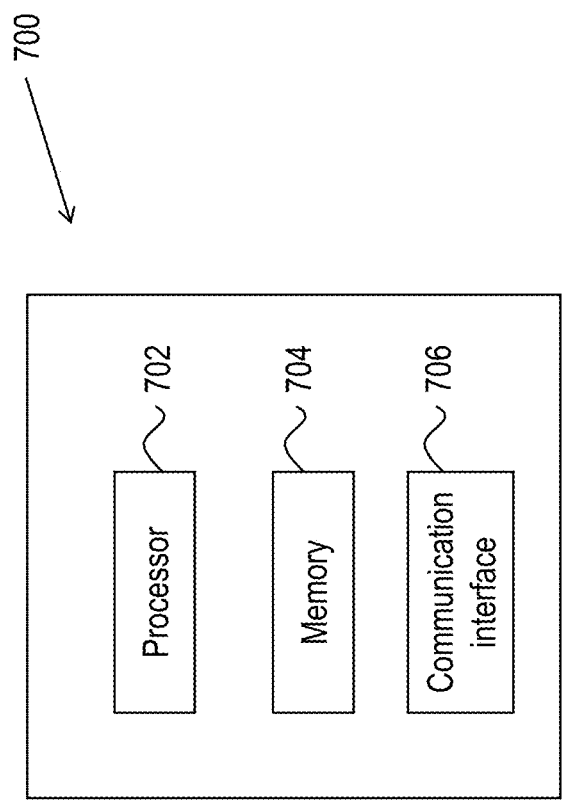
FIG. 7 shows an example of a hardware platform that can implement some techniques described in the present document.

FIG. 7 shows an example of a hardware platform 700 that can be used to implement some of the techniques described in the present document. For example, the hardware platform 700 may implement the methods 500 and 600 or may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement one or more communication protocols (LTE, Wi-Fi, and so on).

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for remote safe driving of a vehicle, comprising:
   periodically transmitting monitoring signals to a remote monitoring center in communication with the vehicle;
   detecting an emergency situation; and
   in response to the detecting,
   switching operation of the vehicle to a low-power operation mode that comprises shutting down a subset of vehicular components; and
   periodically transmitting, to the remote monitoring center, a location of the vehicle where the emergency situation has been detected,
   wherein a period of the transmitting of the location of the vehicle is shorter than a period of the transmitting of the monitoring signals.

2. The method of claim 1, wherein the emergency situation comprises an abnormal sensor operation, an abnormal electronic control unit operation, an abnormal network operation, a failure of a planning module, a failure of a car control module, a failure of a localization module, or a failure of a perception module.

3. The method of claim 1, wherein the subset of vehicular components comprises non-essential sensors and non-emergency subsystems.

4. The method of claim 1, further comprising:
   stopping the vehicle due to the emergency situation;
   shutting down and restarting another subset of vehicular components; and
   performing a status check on at least one of the another subset of vehicular components.

5. The method of claim 4, wherein the vehicle stops in a lane in which the vehicle is operating.

6. The method of claim 4, wherein stopping the vehicle comprises:
   finding an emergency lane; and
   stopping the vehicle in the emergency lane.

7. The method of claim 4, further comprising:
   selectively restarting the operation of the vehicle based on a result of the status check.

8. A non-transitory computer-readable storage medium having instructions stored thereupon, the instructions, when executed by a processor, causing the processor to implement a method for remote safe driving of a vehicle, comprising:
   instructions for periodically transmitting monitoring signals to a remote monitoring center in communication with the vehicle;
   instructions for detecting an emergency situation; and
   in response to the detecting,
      instructions for switching operation of the vehicle to a low-power operation mode that comprises shutting down a subset of vehicular components; and
      instructions for periodically transmitting, to the remote monitoring center, a location of the vehicle where the emergency situation has been detected,
      wherein a period of the transmitting of the location of the vehicle is shorter than a period of the transmitting of the monitoring signals.

9. The non-transitory computer-readable storage medium of claim 8, wherein the emergency situation comprises an abnormal sensor operation, an abnormal electronic control unit operation, an abnormal network operation, a failure of a planning module, a failure of a car control module, a failure of a localization module, or a failure of a perception module.

10. The non-transitory computer-readable storage medium of claim 8, wherein the subset of vehicular components comprises non-essential sensors and non-emergency subsystems.

11. The non-transitory computer-readable storage medium of claim 8, further comprising:
    instructions for stopping the vehicle due to the emergency situation;
    instructions for shutting down and restarting another subset of vehicular components; and
    instructions for performing a status check on at least one of the another subset of vehicular components.

12. The non-transitory computer-readable storage medium of claim 11, wherein the vehicle stops in a lane in which the vehicle is operating.

13. The non-transitory computer-readable storage medium of claim 11, wherein stopping the vehicle comprises:
    instructions for finding an emergency lane; and
    instructions for stopping the vehicle in the emergency lane.

14. The non-transitory computer-readable storage medium of claim 11, further comprising:
    instructions for selectively restarting the operation of the vehicle based on a result of the status check.

15. The non-transitory computer-readable storage medium of claim 8, wherein the location of the vehicle comprises at least one of Global Positioning System (GPS) coordinates, a location relative to mile markers, or a location relative to known Wi-Fi transmitters.

16. An apparatus for remote safe driving of a vehicle, comprising:
    a processor; and
    a memory that comprises instructions stored thereupon, wherein the instructions when executed by the processor configure the processor to:
       periodically transmit monitoring signals to a remote monitoring center in communication with the vehicle;
       detect an emergency situation; and
       in response to the detection of the emergency situation,
       switch operation of the vehicle to a low-power operation mode that comprises shutting down a subset of vehicular components; and
       periodically transmit, to the remote monitoring center, a location of the vehicle where the emergency situation has been detected,
    wherein a period of a transmission of the location of the vehicle is shorter than a period of a transmission of the monitoring signals.

17. The apparatus of claim 16, wherein the emergency situation comprises an abnormal sensor operation, an abnormal electronic control unit operation, an abnormal network operation, a failure of a planning module, a failure of a car control module, a failure of a localization module, or a failure of a perception module.

18. The apparatus of claim 16, wherein the instructions further configure the processor to report the detection of the emergency situation to the remote monitoring center using an emergency signal that includes a location and a vehicle status message.

19. The apparatus of claim 16, wherein the instructions further configure the processor to implement a first policy that causes the vehicle to search for a nearest emergency lane and come to a stop in the nearest emergency lane.

20. The apparatus of claim 16, wherein the instructions further configure the processor to implement a second policy that causes the vehicle to determine whether an immediate stop is needed.

* * * * *